Jan. 10, 1956     F. M. VARNEY     2,730,626

AIRBORNE RADIATION DETECTOR

Filed July 28, 1948

INVENTOR.
FREDERICK M. VARNEY
BY

ATTORNEY

United States Patent Office 2,730,626
Patented Jan. 10, 1956

2,730,626

AIRBORNE RADIATION DETECTOR

Frederick M. Varney, Washington, D. C.

Application July 28, 1948, Serial No. 41,161

10 Claims. (Cl. 250—83.6)

(Granted under Title 35, U. S. Code (1952), sec. 266)

The present invention relates to an airborne penetration radiation detector and more particularly to a device for detecting penetrating rays present in the atmosphere at high altitudes.

It has been discovered that atomic weapons produce a large mass of radioactive air which rises to high altitudes and is conveyed by the winds over wide areas and that such clouds of radioactive air may be detected by instruments carried in high-flying airplanes.

If any country was preparing to wage atomic warfare, it is highly probable that one or more full scale tests would be made of such atomic weapons at least a few days before using them in actual combat to be sure of their operation. When such a weapon were set off in the air, it could be expected to produce no shock which could be detected by seismographic means, but would produce a radioactive air mass.

While a determination of the tests of an atomic weapon could be made by means of a high altitude airplane patrol, the cost of such a patrol would be prohibitive and the execution would require extended flights under difficult conditions.

However, a suitable patrol may be maintained by means of a Geiger counter arranged to operate a radio transmitter when the counter is in a radio-active field and supported by means of a lighter-than-air balloon at a high altitude. It has also been discovered that natural phenomena cause erratic radio-active effects at high altitudes, so that the Geiger counter must be arranged to require a substantial rate of radiation sustained for a period of time in order to cause operation of the transmitter thereby preventing spurious signalling. The signal from the transmitter may be controlled by an automatic code sender which sends a predetermined group of symbols for identification of the particular instrument.

An object of the present invention is the provision of an airborne radiation detector.

Another object is to provide a radiation detector means which is suspended from a balloon at a selected altitude.

A still further object is to provide an airborne radiation detector which is easily adaptable to a desired mode of operation.

A final object is to provide a radio transmitter controlled by a Geiger counter and suspended by a lighter-than-air balloon at a predetermined altitude.

Other objects and features of the invention will become apparent to those skilled in the art as the disclosure is made in the following description of a preferred embodiment of the invention as illustrated in the accompanying drawing in which.

Figure 1:
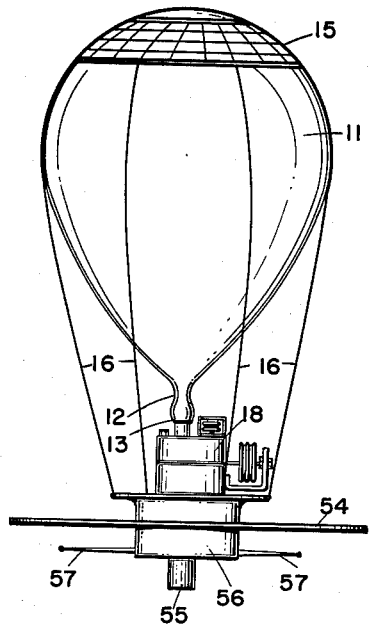
Fig. 1 is a side elevation of a preferred embodiment of the balloon of the invention.

Referring now to the drawings, wherein like reference characters designate like or corresponding parts throughout the several views, there is shown in Fig. 1 a balloon 11 which is made of a gas-tight elastic material, such as rubber, formed in a convenient shape and having a neck 12 with a circular vent 13 of convenient size. The balloon 11 is shown spherical, but may be oblong or of any other desired shape. Such a balloon is inexpensive and simple to manufacture in quantity production, and folds into a small space when deflated.

A non-elastic envelope material may be used instead of elastic material if desired. Such an envelope may be constructed in a convenient shape, and made from a substance such as "nylon" fabric impregnated with "neoprene" or other synthetic rubber compound, and can be very light in weight.

The harness 15 is constructed of flat tape, cord or other suitable material of sufficient size to fit over the balloon 11 when inflated and is fitted with a plurality of risers 16 to be attached to the supported load. The harness 15 is made to cover a substantial portion of the balloon to distribute the loading on the balloon and is sufficiently strong to support the devices to be carried.

Figure 2:
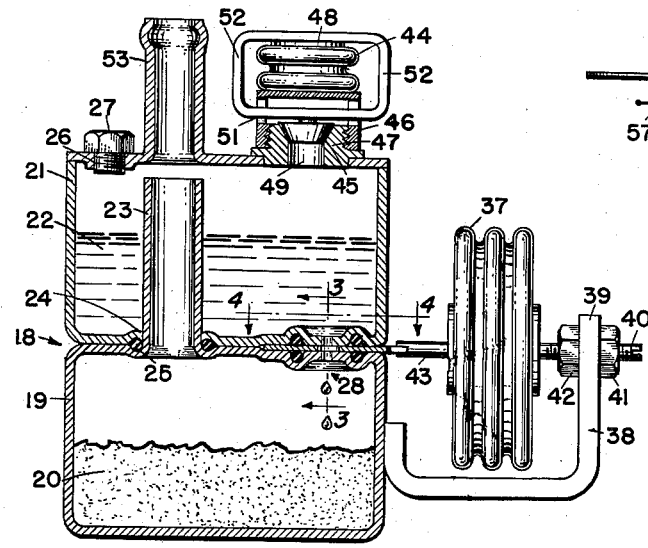
Fig. 2 is a view in section of the hydrogen generator for the balloon.

A lighter-than-air gas generator 18 is supported from the harness 15 and attached to the vent of the balloon 11. As shown in Figure 2 the gas generator comprises a lower tank 19 containing a gas generating chemical 20 and an upper tank 21 containing a liquid chemical 22. A tube 23 attached to the top of the lower tank 19 extends through a hole 24 in the bottom of the upper tank 21 to a height near the top of the upper tank and above the level of the liquid 22. A gasket 25 is placed around the tube 23 and between the tanks to seal the joint thus formed.

Figure 3:
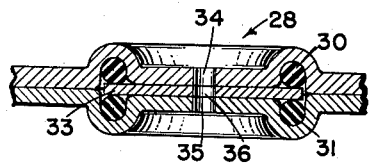
Fig. 3 is a sectional view of the control valve for the generator taken on the line 3—3 of Figure 2 looking in the direction of the arrows.
Figure 4:
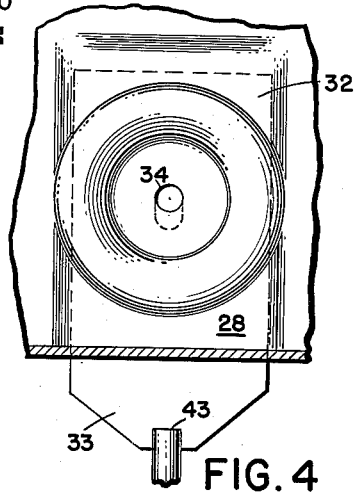
Fig. 4 is a fragmentary plan view of the valve taken on line 4—4 of Figure 2.

A valve 28 is formed between the bottom of the upper tank 21 and the top of the lower tank 19 to control the rate at which the liquid is admitted to the lower tank. As shown in Figures 3 and 4, this valve is formed by shaping the bottom of the upper tank 21 to receive a rubber seal 30 and to provide a recess 32 extending to one side of the tank for a rectangular plate 33 of thin sheet metal. The recess is made slightly larger than the plate 33 and has a depth equal to half the thickness thereof. The matching surface in the top of the lower tank 19 is a mirror image of the bottom of the upper tank, so that the two surfaces make a close fit with the plate and the recess formed between them provides a guide in which the plate 33 may slide in a direction parallel to one side but which substantially prevents movement in other directions. Matching holes 34 and 35 are provided in the two tanks, and a mating elliptical hole 36 is provided in the plate, so that the three holes constitute a gate valve which is subjected to balanced pressures and which minimizes leakage from the tanks. The gaskets 30 and 31 may be molded in circular form or of any other desired shape, and the diameter of the holes 34, 35, 36 need to be not over one-eighth of an inch in diameter so that the plate 33 may be considerable under an inch wide. Obviously other types of valves may be substituted if desired.

The valve 28 is controlled by a sealed metallic bellows 37 which is adjustably secured at its outer end to a bracket attached to the lower tank 19 and at its inner end to the plate 33. A threaded stud 40 fastened to the outer end of the bellows extends through the hole 39 in the bracket and carries two adjusting nuts 41 and 42 on either side of the bracket. A stud 43 fastened to the inner end of the bellows is attached to the valve plate 33 in any convenient manner, as by slotting the end of the stud to receive the plate and inserting a pin or by soldering. The bellows 37 is subjected to atmospheric pressure and moves the plate 33 back and forth as it contracts and expands with changes in altitude.

A second sealed metallic bellows 44 is adjustably mounted on the top of the upper tank 21 and connected to a valve 45 which vents the tank to the atmosphere upon expansion of the bellows 44 when and if the balloon 11 rises too high. The lower end of the bellows 44 is fastened to a cup 46 which is threadedly engaged with a fitting 47 attached to the top of the tank and containing the valve seat 45. A plate 48 attached to the top of the bellows is connected to the valve plunger 49 by means of a cross head 51 and arms 52.

The valves 28 and 45 require very little power for their operation. However, it is desirable to make the metallic bellows as large as practical to insure adequate power without a severe loss of accuracy. Also secured to the top of the upper tank 21 is a tubular neck 53 which has an expanded portion adapted to fit tightly inside the vent 13 of the balloon 11, and a filling opening 26 and a plug 27.

The chemical 20 is placed in the lower tank 19 through the tube 23 and may be any suitable chemical which will react with a liquid to form hydrogen at sufficient pressure to inflate the balloon 11. For the purposes of illustration, the chemical 20 may be lithium hydride while the liquid 22 may be water mixed with alcohol to reduce its freezing point, since the reaction between these chemicals produces hydrogen at a pressure of about eight inches of mercury.

A baffle 54 is attached to the device to prevent rapid changes in altitude and hence to stabilize the operation of the balloon. The baffle may be of convenient size and shape and attached to the instrument in any desired manner, and may be constructed of fabric attached to a light frame, fibre, or thin light metal. However, the use of metal is not desirable, because of the close proximity of the antenna 57, although the baffle may be used as the antenna if properly designed. A wire frame antenna covered with "nylon" fabric could be used, thus combining the functions of both the baffle 54 and the antenna 57.

Also secured to the harness 15 is a Geiger counter 55 and an electronic unit shown generally by the reference character 56 which also includes the necessary batteries to supply power to the device and a suitable antenna system 57.

The Geiger counter 55 may be of any type desired, but is preferably of a type requiring a low energizing voltage, since this voltage must be supplied by a small light power unit.

Figure 5:
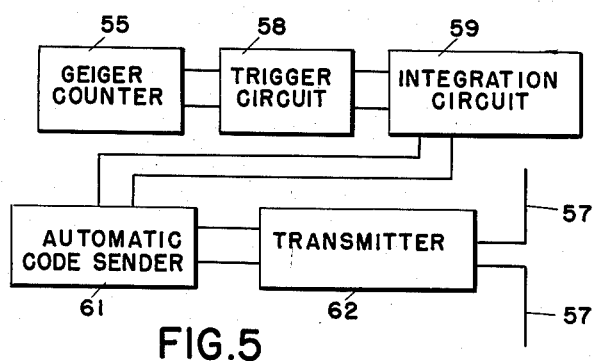
Fig. 5 is a block diagram of the Geiger counter and the radio transmitter.

Referring now to Fig. 5, the Geiger counter 55 is connected with its usual high voltage and resistance in a series circuit, and the voltage across the series resistor is used to operate a trigger circuit 58, which may be a flip-flop circuit such as the Eccles-Jordan trigger circuit, which has a normally cut-off tube circuit.

The integration circuit 59 may consist of a thermal responsive relay connected in the plate circuit of the normally cut-off tube of the trigger circuit, which is so designed that any normal radio-active background will not be conducting for a sufficient proportion of the time to heat the thermal responsive element to cause it to close its contacts, but which will heat the thermal responsive element to close its contacts if a high level of radio-activity persists for an appreciable period of time.

The circuit of the trigger circuit 58 and the integration circuit 59 are conventional and one skilled in the art could easily design such circuits to suit his particular application. For this reason, the elements are shown in a block diagram and are not described in detail as they are not per se part of the invention.

The response of the integration circuit controls the operation of the automatic code sender 61, which may consist of a small constant speed electric motor driving a cam disc operating contacts connected to the transmitter 62. The cam disc may be formed with indentations to form a desired group of characters. Such devices are also well known in the radio art and need no description in this application.

The transmitter 62 is of conventional design, and may consist of an oscillator coupled to an antenna 57 of any desired type. The oscillator is preferably stabilized by a crystal or other means, and may be modulated in any desired manner. The design of the transmitter is no part of the present invention, and is shown only in block form.

In operation, lithium hydride is placed in the lower tank 19 and the top tank 21 placed on it with the proper gaskets and seals in place and the tanks secured together with clamps or screws. The bellows 37 is adjusted to close the valve 28 at the altitude at which the device is to be maintained and the bellows 44 is adjusted to open at a slightly higher altitude than the adjustment of the bellows 37.

The integration circuit 59 is adjusted to maintain its contacts open in a field of normal radio-activity due to cosmic rays and other normal ionizing radiations at the location and altitude at which the instrument is to operate. Since natural phenomena are usually discontinuous and erratic, the integration circuit prevents the operation of the transmitter 62 on any normal short-lived bursts of high cosmic ray intensity likely to be encountered.

The transmitter 62 is adjusted to the desired frequency and tuned to the antenna 57, and the automatic code sender is fitted to send a predetermined identifying signal. The Geiger counter 55, the electronic unit 56, and the gas generator 18 are secured together and attached to the harness 15, and the vent of the balloon 11 is slipped over the neck 53 of the gas generator. Water is added to the upper tank 21 of the generator through the filling opening and the tank sealed by the plug 27. Since the device is below the desired altitude, the valve 45 is closed and the valve 28 is open, admitting water 22 to the lithium hydride 20 which inflates the balloon and causes it to rise.

When the desired altitude is reached, the valve 28 closes, stopping the generation of hydrogen. If the balloon 11 does not continue to rise considerably above the desired altitude, no further action takes place until the balloon descends slightly at which time the valve 28 is again opened. However, if the balloon rises considerably above the desired altitude the valve 45 opens and allows hydrogen to escape from the balloon causing it to fall to approximately the correct altitude.

If the Geiger counter 55 is in a field of normal radio-activity, the integration circuit 59 does not actuate the automatic code sender 61 and no signal is emitted by the transmitter 62. Should the Geiger counter enter a field of high radio-activity which continues for an appreciable time, the automatic code sender will be energized to cause the transmitter 62 to emit a signal which persists so long as the Geiger counter remains in the highly radio-active field, or until the batteries are exhausted.

If a radio receiver is left on the frequency of the transmitter 62, an operator on the ground may hear any signal emitted from the transmitter, and can identify the particular instrument by the group of characters received. He may then employ radio direction finding equipment to determine the location of the instrument if desired.

Many modifications may be made in the device by those skilled in the art. The balloon 11 may be made of non-elastic material of a size computed to support the weight of the device at the desired altitude and of sufficient strength to withstand the maximum gas pressure which the generator can produce, in which case both bellows and valves may be dispensed with. The opening for the valve 45 may be fitted with a pressure relief valve and an orifice fitted into the recess 32 to limit the flow of water into the lower tank.

An elastic balloon may be used with only the bellows 44 and the valve 45, and omitting the bellows 37 if the altitude need not be too accurately controlled. It is also evident that the gas generator 18 may be used with the bellows 37 and the valve 28, and omitting the relief valve 45, with a slight decrease in accuracy of altitude control.

The instrument may be moored in a particular location by means of thin high tensil strength wire attached to the balloon and to a suitable anchor on the ground. In such a case, all altitude control may be dispensed with, since the length of the wire controls the altitude of the device.

Only the Geiger counter 55 and the trigger circuits 58 need be energized continuously because the transmitter 62 may be turned on when the automatic code sender is energized, thus making the drain on the batteries quite small, so that the instrument remains operative if left aloft for long periods. The gas generator automatically maintains the balloon in a filled condition for a considerable time, and since the cost of the instrument is relatively low, it may be used as a non-recoverable device, if such operation should be desired.

A large number of balloons may be maintained in the air at the same time to cover a wide area. All the transmitters may be tuned to the same frequency so that a single receiving station may monitor many balloons or separate receivers on different predetermined frequencies may be used.

A vibrator power pack may be used to supply power to the electronic unit 56 instead of a conventional battery supply, and a storage battery may be used to supply the vibrator power pack. Such design details can be handled by anyone skilled in the art.

The instrument may also be used for cosmic ray investigations either with an integration circuit or without it, and with or without the automatic code sender. The trigger circuit 58 may be caused to energize the transmitter 62 each time an ionizing particle strikes the Geiger counter, enabling the operator to employ counting apparatus on the ground.

It will be obvious to those skilled in the art that a wide variety of altitude control means may be employed in the place of those shown. Such a means may include the radio altimeter connected to operate the valves 28 and 45 by means of electromagnets, pneumatic pressure from the balloon, or other suitable arrangements.

It should be understood, of course, that the forgoing disclosure relates only to a preferred embodiment of the invention, and that numerous modifications or alterations may be made therein without departing from the spirit and the scope of the invention as set forth in the appended claims.

The invention herein described may be manufactured and used by or for the Government of the United States of America for governmental purposes without the payment of any royalties thereon or therefor.

Having thus described the invention, what is claimed is:

1. In a constant altitude balloon, an impervious envelope adapted to be inflated with a lighter-than-air gas, a lighter-than-air gas generator attached to and supported by said envelope for automatically inflating said envelope, and altitude responsive means to control the volume of said gas in said envelope to maintain said envelope at a predetermined altitude.

2. In a constant altitude balloon, an impervious envelope adapted to be inflated with a lighter-than-air gas, a lighter-than-air gas generator attached to and supported by said envelope for automatically inflating said envelope, and means controlled by atmospheric pressure to control the generation of said lighter-than-air gas so as to maintain said envelope at a predetermined altitude.

3. In a constant altitude balloon, an impervious envelope adapted to be inflated with a lighter-than-air gas, a lighter-than-air generator attached to and supported from said envelope for automatically inflating said envelope, and means responsive to atmospheric pressure for venting said envelope to reduce the gas pressure therein so as to maintain said envelope at a predetermined altitude.

4. In a constant altitude balloon, an impervious envelope adapted to be inflated with hydrogen gas, a hydrogen gas generator adapted to automatically inflate said envelope attached to and supported by said envelope comprising a first tank having therein a first chemical containing hydrogen, a second tank containing a second chemical which reacts with said first chemical to release said hydrogen, a valve connected between said tanks to control the reaction rate, and atmospheric pressure means connected with said valve to control the volume of hydrogen introduced into said envelope, whereby to maintain said envelope at a predetermined altitude.

5. In a constant altitude balloon, an impervious envelope adapted to be inflated with hydrogen gas, a hydrogen gas generator attached to and supported by said envelope and adapted to automatically inflate said envelope comprising a first tank having therein a first chemical containing hydrogen, a second tank containing a second chemical which reacts with said first chemical to release said hydrogen, means connecting said first tank with said second tank to release said hydrogen, a valve for venting said envelope to the atmosphere, and means responsive to atmospheric pressure to control the operation of said valve, whereby to maintain the envelope at a predetermined altitude.

6. In a constant altitude balloon, an envelope of elastic impervious material adapted to be inflated with hydrogen gas, a hydrogen gas generator attached to and supported by said envelope to automatically inflate said envelope and comprising a first tank containing lithium hydride, a second tank containing water, and valve means connecting said first tank and said second tank to control the flow of water to said first tank, sealed metallic bellows means responsive to atmospheric pressure connected to operate said valve means, second valve means connected with said envelope to vent said envelope to the atmosphere, and second metallic bellows means responsive to atmospheric pressure connected to operate said second valve, so that said first valve prevents the generation of hydrogen above a first predetermined altitude and said second valve releases hydrogen at a second higher predetermined altitude thereby maintaining said envelope at a substantially constant predetermined altitude.

7. In an airborne penetrating ray source detector, an impervious envelope adapted to be inflated with a lighter-than-air gas, a lighter-than-air gas generator attached to and supported from said envelope for automatically inflating said envelope, altitude responsive means to control the volume of gas in said envelope to maintain said envelope at a predetermined altitude, ionizing ray detecting means carried by said envelope, radio transmitter means carried by said envelope and circuit means actuated by said ionizing ray detecting means to cause said transmitter means to emit a signal when said ionizing ray detecting means is in a radio-active field.

8. In an airborne penetrating ray source detector, an impervious envelope adapted to be inflated with a lighter-than-air gas, a lighter-than-air gas generator attached to and supported from said envelope so as to automatically inflate said envelope, comprising a first tank having therein a first chemical containing hydrogen, a second tank containing a second chemical which reacts with said first chemical to release said hydrogen, valve means between the said tanks to control the mixing of said chemicals, atmospheric pressure means connected to said valve means to control said reaction, an ionizing ray detection means carried by said envelope, a radio transmitter also carried by said envelope, a trigger circuit connected to said ionizing ray detection means, and means controlled by said trigger circuit to cause said radio transmitter to emit a signal when said ionizing ray is in a radio-active field.

9. In an airborne penetrating ray source detector, an impervious envelope adapted to be inflated with hydrogen, a hydrogen gas generator connected to and supported from said generator comprising a first tank containing a first chemical comprising hydrogen, a second tank containing a second chemical which reacts with said first chemical to release said hydrogen, means connecting said first tank with said second tank, valve means to vent said envelope to the atmosphere, atmospheric pressure operated means connected with said valve means to control the volume of said envelope, ionizing ray detecting means carried by said envelope, radio transmitter means also carried by said envelope, a trigger circuit connected with said ionization ray detector means and an automatic code sender connected with said transmitter means to control its emission and actuated by said trigger circuit, whereby said transmitter emits a predetermined signal when said ionizing ray detector means is in a radio-active field.

10. In an airborne penetrating ray source detector, an impervious envelope adapted to be filled with hydrogen, a hydrogen generator connected to and supported by said envelope and adapted to automatically inflate said envelope and comprising a first tank containing a first chemical comprising hydrogen, a second tank containing a second chemical reacting with said first chemical to release said hydrogen, first valve means connecting said first and second tanks to control the mixing of said chemicals, metallic bellows means responsive to atmospheric pressure connected to said first valve means to control the generation of said hydrogen, second valve means connected to said envelope to vent said envelope to the atmosphere, second metallic bellows means responsive to atmospheric pressure connected to said second valve means to reduce the volume of gas enclosed in said envelope, ionizing ray detecting means carried by said envelope, radio transmitting means carried by said envelope, a trigger circuit connected to said ionizing ray detecting means, and an automatic code sender connected with said radio transmitting means and actuated by said trigger circuit to cause said transmitter means to emit a predetermined signal when said ionizing ray detector means is in a radio-active field.

References Cited in the file of this patent

UNITED STATES PATENTS

| | | |
|---|---|---|
| 1,755,359 | Moses | Apr. 22, 1930 |
| 2,341,351 | Barkley | Feb. 8, 1944 |
| 2,347,160 | Wallace | Apr. 18, 1944 |
| 2,392,199 | Steiger | Jan. 1, 1946 |
| 2,434,297 | Jest et al. | Jan. 13, 1948 |

OTHER REFERENCES

Milikan et al.: Physical Review, vol. 50, 1936, pp. 992–998.

Neher et al.: Review of Scientific Instruments, vol. 13, April 1942, pp. 143–147.